E. E. GILMER.
SIDEWALK AND VAULT LIGHT.
APPLICATION FILED MAY 20, 1910.
991,465.
Patented May 2, 1911.
2 SHEETS—SHEET 1.
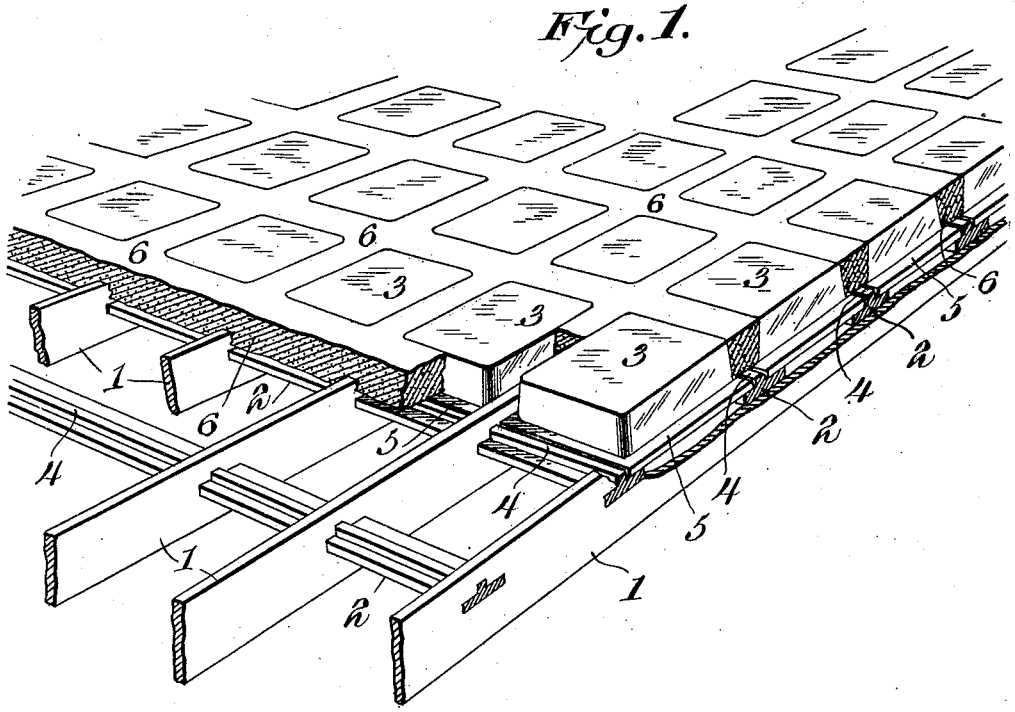
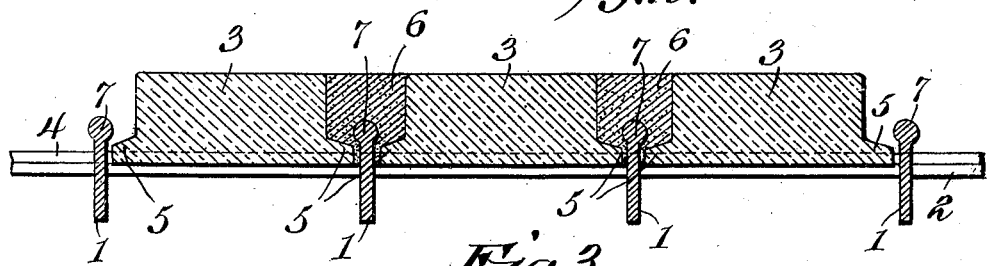
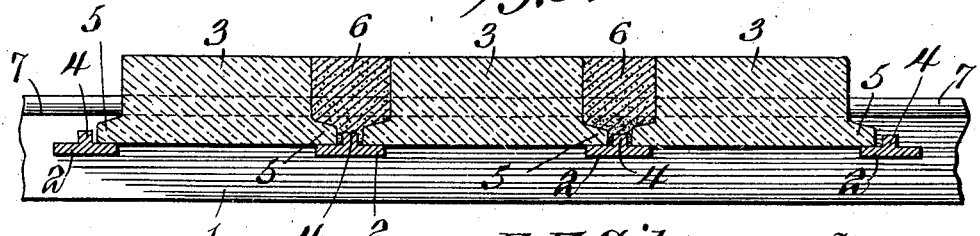
E. E. Gilmer, Inventor,
Witnesses
Howard D. Orr.
R. W. Bishop
By E. G. Siggers
Attorney

UNITED STATES PATENT OFFICE.

ERNEST E. GILMER, OF WHITE SALMON, WASHINGTON.

SIDEWALK AND VAULT LIGHT.

991,465.  Specification of Letters Patent.  Patented May 2, 1911.

Application filed May 20, 1910. Serial No. 562,539.

*To all whom it may concern:*

Be it known that I, ERNEST E. GILMER, a citizen of the United States, residing at White Salmon, in the county of Klickitat and State of Washington, have invented a new and useful Sidewalk and Vault Light, of which the following is a specification.

This invention relates to improvements in sidewalk and vault-light construction, and the object of the invention is to provide a simple and efficient construction whereby the lenses may be rapidly placed in position without the necessity of abutments or depending flanges at the sides of the same, so that twisting of the same, in order to bring them into position upon the frame, is unnecessary.

A further object of the invention is to provide a cheap and simple construction whereby when the cement filling has been placed between the lenses, the same will be locked to the frame so that loosening or the withdrawal of the lenses will be prevented.

Other incidental objects of the invention will appear as the description of the same proceeds.

In the accompanying drawings, I have illustrated means whereby the objects of my invention are attained, and the invention consists in certain novel features thereof which will be hereinafter first fully described and then more particularly pointed out in the appended claims.

Figure 6:
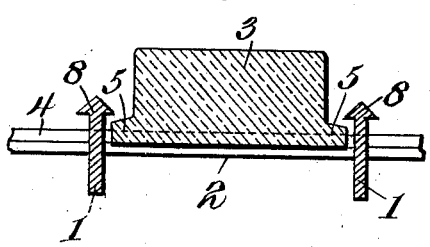
Figure 7:
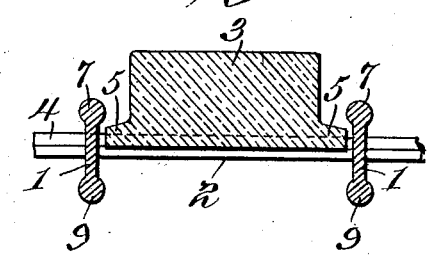
Figure 8:
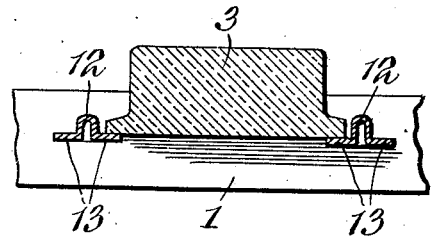
Figure 9:
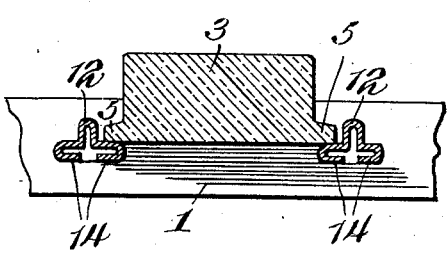
Figure 10:
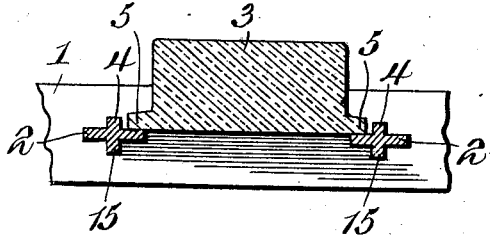
Figure 11:
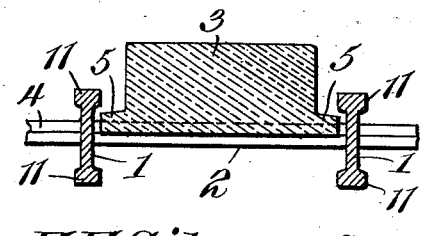

In the drawings, Figure 1 is a perspective view of a portion of a sidewalk and vault cover embodying my invention. Figs. 2 and 3 are sectional views of the same taken at right angles to each other. Figs. 4, 5, 6 and 7 are detail sectional views showing various forms of carrying bars which may be employed. Figs. 8, 9 and 10 are detail sectional views showing various forms of supporting or cross bars. Fig. 11 is a similar view showing a still further form of carrying bar.

In carrying out my present invention, I employ the carrying bars 1 which are secured at their ends in the walls of the vault or other structure and which are provided at intervals below their upper edges with transverse openings through which the supporting bars 2 are inserted to form a grating adapted to receive and support the lenses 3, as will be readily understood. The carrying bars 1 are shown in Fig. 1 as rectangular iron or steel girders or beams, and the cross bars 2 as flat bars having central longitudinal ribs 4 on their upper sides, the bars thus constituting short ribbed T-bars. An angular engagement of the cross bars with the carrying bars is thus effected so that twisting of the bars one upon the other is prevented and the fitting of the bars together facilitated. The lenses, in the form illustrated, are provided with lateral or substantially horizontal flanges 5 on all their sides, and the bars 1 and 2 will be spaced apart the proper distance to accommodate the particular size of lens to be employed. The edges of the flanges 5 on two opposite sides of the lens will fit between the sides of the bars 1, while the other side flanges of the lenses will fit between the ribs 4 of the cross bars so that the lenses will be accurately centered between the bars, the edges of the lenses resting upon the upper surface of the cross bars 2, as shown clearly in Fig. 3. After the lenses have been placed in position upon the cross bars, cement filling 6 is placed in the space between the lenses and permitted to set or harden, it being observed that the upper edges of the carrying bars 1 will project above the flanges 5 on the lenses so as to become anchored in the cement filling and thereby add to the rigidity and strength of the finished structure.

It will be readily noted that the ribs on the cross bars serve as stops or guides to bring the lenses into the proper position in the frame and terminate below the upper edges of the carrying bars so that they offer no obstruction to the placing of the lenses between the said carrying bars. The base of each lens may be smooth or may be provided with pendent prisms, as may be preferred, but in no event is it necessary to provide lateral abutments to engage the carrying bars and, consequently, the twisting or other peculiar manipulation of the lenses in order to bring them into proper position in the frame is obviated.

Figure 4:
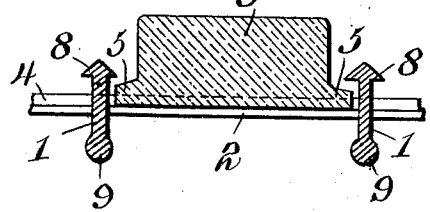
Figure 5:
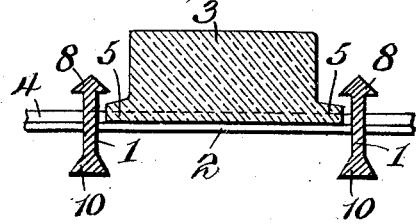

The longitudinal or carrying bars 1 may be of any desired cross sectional form and, in Fig. 2, I have shown these bars as provided with circular heads or ribs 7 which will take into the cement filling so as to anchor the same to the lenses, as will be readily understood. This rib or head, furthermore, tends to impart additional rigidity to the carrying bar so as to increase the strength of the structure. In Fig. 6 is shown a similar carrying bar in which the reinforcing rib or head is triangular instead of circular, and in Figs. 4, 5, 7 and 11, I have shown the carrying bars as provided with reinforcing ribs at both their upper and lower edges. In Figs. 4, 5 and 6, the triangular ribs or heads 8 are shown at the upper edges of the bars, while in Figs. 4 and 7 are shown circular beads or ribs at the lower edges of the bars, indicated at 9. The circular bead 7 is also shown at the upper edge of the carrying bars in Fig. 7, while in Fig. 5, the lower edge of the bar is provided with a substantially triangular rib 10. In Fig. 11, the upper and lower edges of the bars are both provided with substantially rectangular ribs or heads 11. In all these different forms, it will be noticed that the sides of the bars are straight and parallel and that the upper edges of the same are spaced above the extreme side edges of the lenses, which fit between the sides of the bars so that on neither the lens nor the bar is there any obstruction to the rapid fitting of the lens between two bars.

The cross bar or support 2 may be of varied cross sectional form and may be either rolled, cast or pressed, as may be preferred. In Figs. 1 and 3, I have shown this bar as having a flat under side and having a short central rib formed integral therewith on its upper side. In Figs. 8 and 9 are shown forms of stamped or pressed bars in which the bar consists of a central inverted U-shaped portion 12 and lens-supporting flanges 13 at the sides of said U-shaped portions, while in Fig. 9, the bar is provided with additional flanges or doubled-under portions 14 whereby additional strength is imparted to the base or lens-supporting portion of the bar. In Fig. 10, the bar is shown with a central solid rib 15 on its under side.

My invention is applicable to sidewalks and to vaults, as well as to the coverings of areaways or the roofs of buildings and wherever it is desirable to secure the fullest possible illumination. The device is free of all complicated constructions and arrangements of parts and produces a structure of the requisite strength with a minimum use of material.

The advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. The combination of carrying bars provided at their upper edges with anchoring ribs, separate cross bars each provided with a longitudinal positioning rib on its upper face and inserted through the carrying bars, lenses of greater thickness than the distance of the anchoring ribs of the carrying bars above the upper faces of the cross bars, said lenses having two opposite sides fitting between the sides of the carrying bars below the anchoring ribs thereon, and the other sides of the lenses resting on the cross bars between the ribs thereon and the corresponding edges of said cross bars, and a filling between the lenses completely embedding the anchoring ribs.

2. In a sidewalk and vault light structure, carrying bars each formed on both edges with reinforcing ribs, separate cross bars traversing the web of each carrying bar between the reinforcing ribs thereon, each cross bar being provided with a central longitudinal rib on its upper face, and lenses conforming in shape to the space inclosed by adjacent carrying bars and adjacent traversing bars, the lenses being of greater thickness than the height of the carrying bars above the upper faces of the traversing bars and provided on opposite edges with side extensions adapted to rest on the portions of the traversing bars included between the central ribs and the edges of the bars.

3. A sidewalk and vault light structure comprising carrying bars each formed on both edges with reinforcing ribs, separate cross bars traversing the web of each carrying bar between the reinforcing ribs thereon, each cross bar being provided with a central longitudinal rib on its upper face, lenses conforming in shape to the space inclosed by adjacent carrying bars and adjacent traversing bars, the lenses being of greater thickness than the height of the carrying bars above the upper faces of the traversing bars and provided on opposite edges with side extensions adapted to rest on the portions of the traversing bars included between the central ribs and the edges of the bars, and a filling between the lenses completely embedding those portions of the carrying bars and traversing bars between the sides of the lenses, said filling reaching to the top of the lenses.

In testimony, that I claim the foregoing as my own, I have hereto affixed my signature in the presence of two witnesses.

ERNEST E. GILMER.

Witnesses:
WM. H. AHRENS,
M. M. AHRENS.

---

Copies of this patent may be obtained for five cents each, by addressing the "Commissioner of Patents, Washington, D. C."